US006907945B2

(12) United States Patent
Kim

(10) Patent No.: US 6,907,945 B2
(45) Date of Patent: Jun. 21, 2005

(54) WHEEL CHAIR

(76) Inventor: Ki-Soo Kim, 104-302, Hongik Apt., #139-1, Sinyangbok-ri, Keumkwang-myeon, Ansung-si, Gyeonggi-do 456-862 (KR)

( * ) Notice: Subject to any disclaimer, the term of this patent is extended or adjusted under 35 U.S.C. 154(b) by 0 days.

(21) Appl. No.: 10/478,040

(22) PCT Filed: May 23, 2002

(86) PCT No.: PCT/KR02/00978

§ 371 (c)(1),
(2), (4) Date: Nov. 17, 2003

(87) PCT Pub. No.: WO02/096336

PCT Pub. Date: Dec. 5, 2002

(65) Prior Publication Data

US 2004/0149499 A1 Aug. 5, 2004

(30) Foreign Application Priority Data

May 24, 2001 (KR) ........................................ 2001-28622

(51) Int. Cl.[7] ................................................ B62D 51/06
(52) U.S. Cl. ................... 180/8.2; 180/8.3; 280/DIG. 10
(58) Field of Search ........................... 180/8.1, 8.2, 8.3, 180/907; 280/250.1, 5.26, DIG. 10; 475/332

(56) References Cited

U.S. PATENT DOCUMENTS 2,742,973 A * 4/1956 Johannesen ................. 180/8.2
2,931,449 A * 4/1960 King .......................... 180/8.2
3,450,219 A * 6/1969 Fleming ..................... 180/8.2
4,790,548 A * 12/1988 Decelles et al. ........... 280/5.26
4,794,999 A * 1/1989 Hester ........................ 180/8.2
5,273,296 A * 12/1993 Lepek ........................ 280/5.2
5,482,305 A 1/1996 Jeffries et al. ........... 280/250.1
6,550,787 B1 * 4/2003 Chu et al. .................. 280/5.28

FOREIGN PATENT DOCUMENTS

| | | |
|---|---|---|
| JP | 4-255322 | 8/1992 |
| JP | 10-151158 | 6/1998 |
| JP | 10-211240 | 8/1998 |
| KR | 2001-0049058 | 6/2001 |

OTHER PUBLICATIONS

PCT International Search Report; International application No. PCT/KR02/00978; International filing date of: May 23, 2002; Mailing date of: Sep. 12, 2002.
PCT International Preliminary Examination Report; International application No. PCT/KR02/00978; International filing date of: May 23, 2002; Date of Completion: Sep. 24, 2003.

* cited by examiner

*Primary Examiner*—Daniel G. DePumpo
(74) *Attorney, Agent, or Firm*—Cantor Colburn LLP

(57) ABSTRACT

Disclosed is a wheel chair capable of going over an obstacle or ascending or descending a stair. The wheel chair comprises a wheel frame; an actuator coupled to the wheel frame; a power generating unit coupled to the actuator; a first transmission having a sun gear fixed to the power generating unit, a plurality of planet gears meshed with the sun gear, a ring gear meshed with the respective planet gears, and carriers coupled to the respective planet gears; a second transmission having a driving shaft meshed with the ring gear, a key frame rotatably installed on the driving shaft, and a casing fixed to the key frame; a plurality of front wheels each coupled to the driving shaft; a follower drivingly coupled to the driving shaft and having a follower shaft; and a rear wheel fixed to the follower shaft.

13 Claims, 15 Drawing Sheets

WHEEL CHAIR

BACKGROUND OF THE INVENTION

1. Field of the Invention

The present invention relates to a wheel chair, and more particularly to a wheel chair capable of easily ascending or descending obstacles or stairs, and enabling a user to always have a stable posture.

2. Description of the Related Art

Generally, patients or handicapped persons who do not behave by the force of his/her will utilize a wheel chair to move or travel. Such wheelchairs include a wheel frame having a seating part allowing a user to keep a seating posture. The wheel frame is provided with a rear wheel of a relatively large diameter. The rear wheel may be manually driven by a hand of the user or automatically driven by a separate actuator. In addition, the wheel frame is provided at a front thereof with a front wheel for stably maintaining the wheel frame.

With the structure of the conventional wheelchair as described above, the wheels are only rotated by an axle or driving shaft. Accordingly, the wheel chair may move on a level ground or easily go over the obstacle of a restricted height, without difficulty. During moving on the sands or marshy ground, or going over a high obstacle (in particular, the stairs), there is a problem in that the wheel idles or does not go over the obstacle.

In case of moving on a slope, since the user leans corresponding to the inclination of the slope, the user may not maintain the stable seating posture.

In case of the automatic-type wheel chair utilizing the actuator or motor, when the wheel chair is manually driven in case it is out of order, since the user rotates the rear wheel by holding it, thereby requiring excessive power.

In addition, in case of reinforcing or improving the function of the wheel chair, since the number of components is increased, the cost is expensive and the weight is increased.

SUMMERY OF THE INVENTION

Therefore, an object of the present invention is to solve the problems involved in the prior art, and to provide a wheel chair capable of easily ascending or descending obstacles or stairs.

Another object of the present invention is to provide a wheel chair capable of enabling a user to always have a stable posture when moving on a slope.

A further object of the present invention is to a wheel chair capable of enabling a user to easily manually drive it when power supply is interrupted.

A still object of the present invention is to a lightweight wheel chair having a simplified construction.

In order to accomplished the above mentioned objects, the present invention provides a wheel chair capable of going over an obstacle or ascending or descending a stair, the wheelchair comprising: a wheel frame having a seat on which a user sits; an actuator coupled to the wheel frame for supplying driving force; a power generating unit having a main shaft coupled to the actuator; a first transmission having a sun gear fixed to the main shaft, a plurality of planet gears meshed with the sun gear and rotating or revolving in accordance with applied load, a ring gear meshed with the respective planet gears, and carriers coupled to the respective planet gears and rotated by the planet gears; a second transmission having a driving shaft meshed with the ring gear of the first transmission, a key frame rotatably installed on the driving shaft, coupled to the carrier, and serving as a role of a center shaft during a step operation, and a casing fixed to the key frame; a plurality of front wheels each coupled to the driving shaft of the second transmission and fixed to rotating shafts each rotatably fixed to the casing; a follower drivingly coupled to the driving shaft and the key frame and having a follower shaft to which the wheel frame is fixed; and a rear wheel fixed to an end of the follower shaft of the follower.

BRIEF DESCRIPTION OF THE DRAWINGS

The above objects, other features and advantages of the present invention will become more apparent by describing the preferred embodiment thereof with reference to the accompanying drawings, in which.

DETAILED DESCRIPTION OF THE INVENTION

Reference will now be made in detail to first and second preferred embodiments of the present invention, examples of which are illustrated in the accompanying drawings. For the clarity, a half section of the driving unit is shown in detail. In addition, a term related to a direction hereinafter is one determined when viewing at front from the drawings, and the scope of the present invention is not limited thereto.

Figure 1:
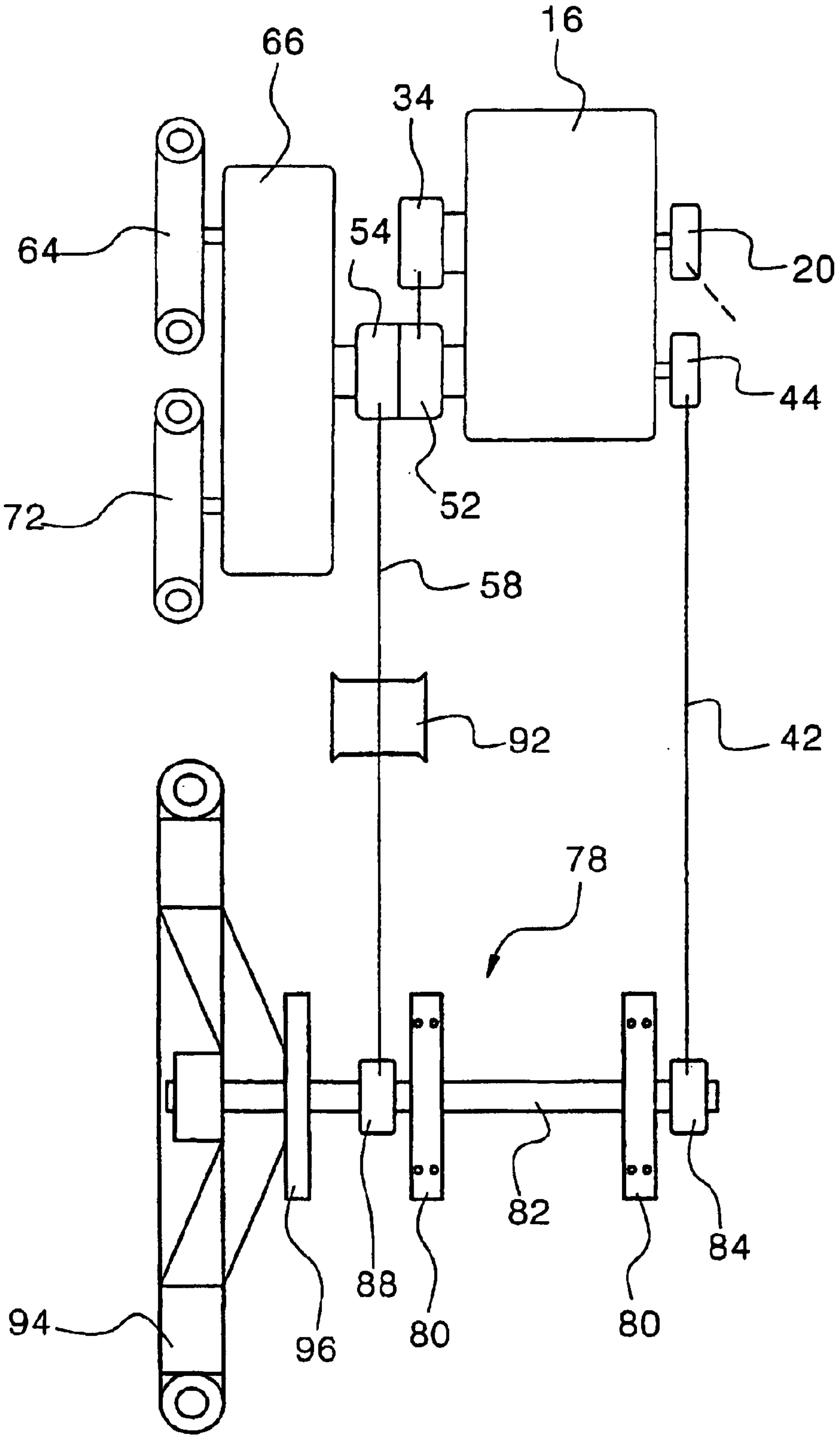
FIG. 1 is a schematic view for illustrating of a half section of the entire driving unit of a wheel chair according to one preferred embodiment of the present invention.
Figure 2:
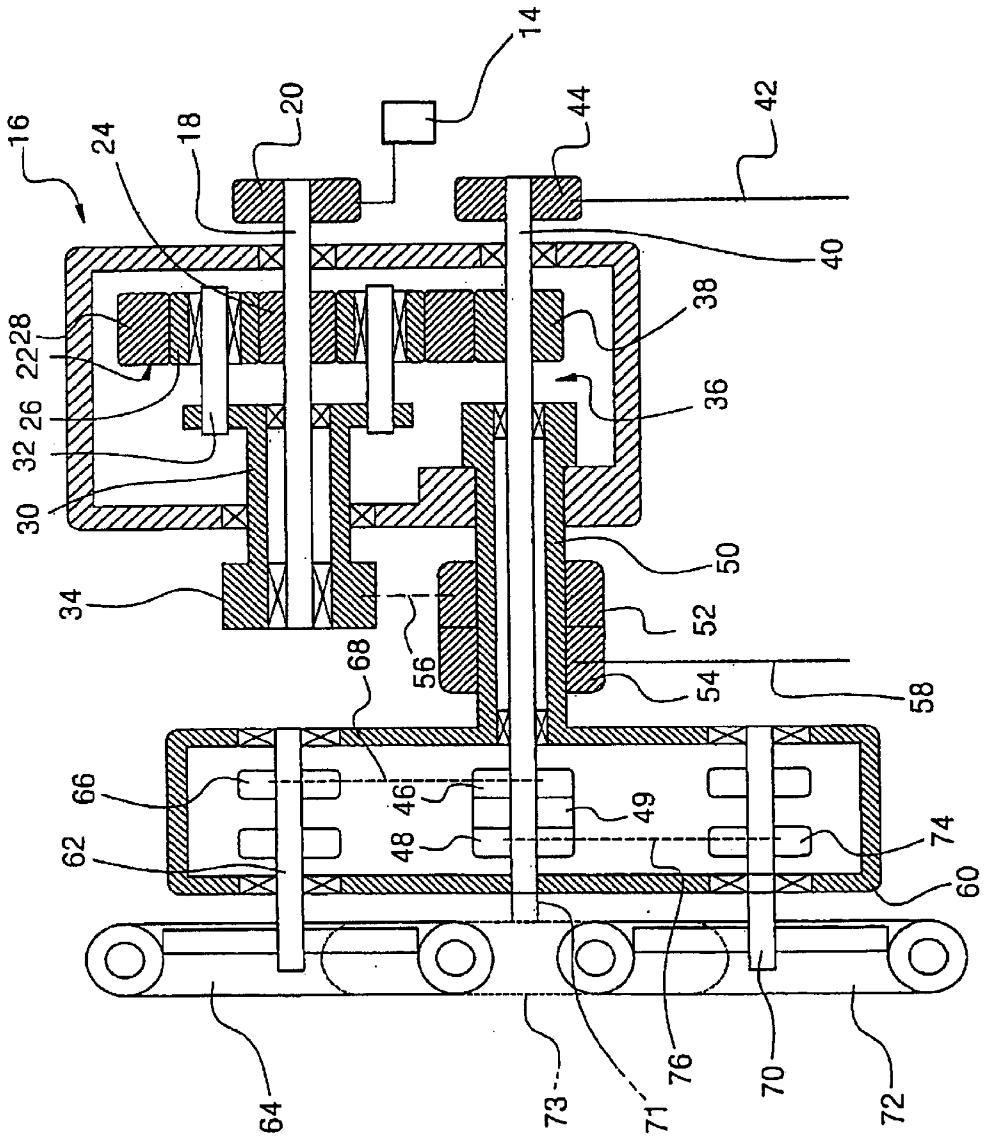
FIG. 2 is a cross sectional view of the front-wheel driving section shown in FIG. 1.
Figure 3:
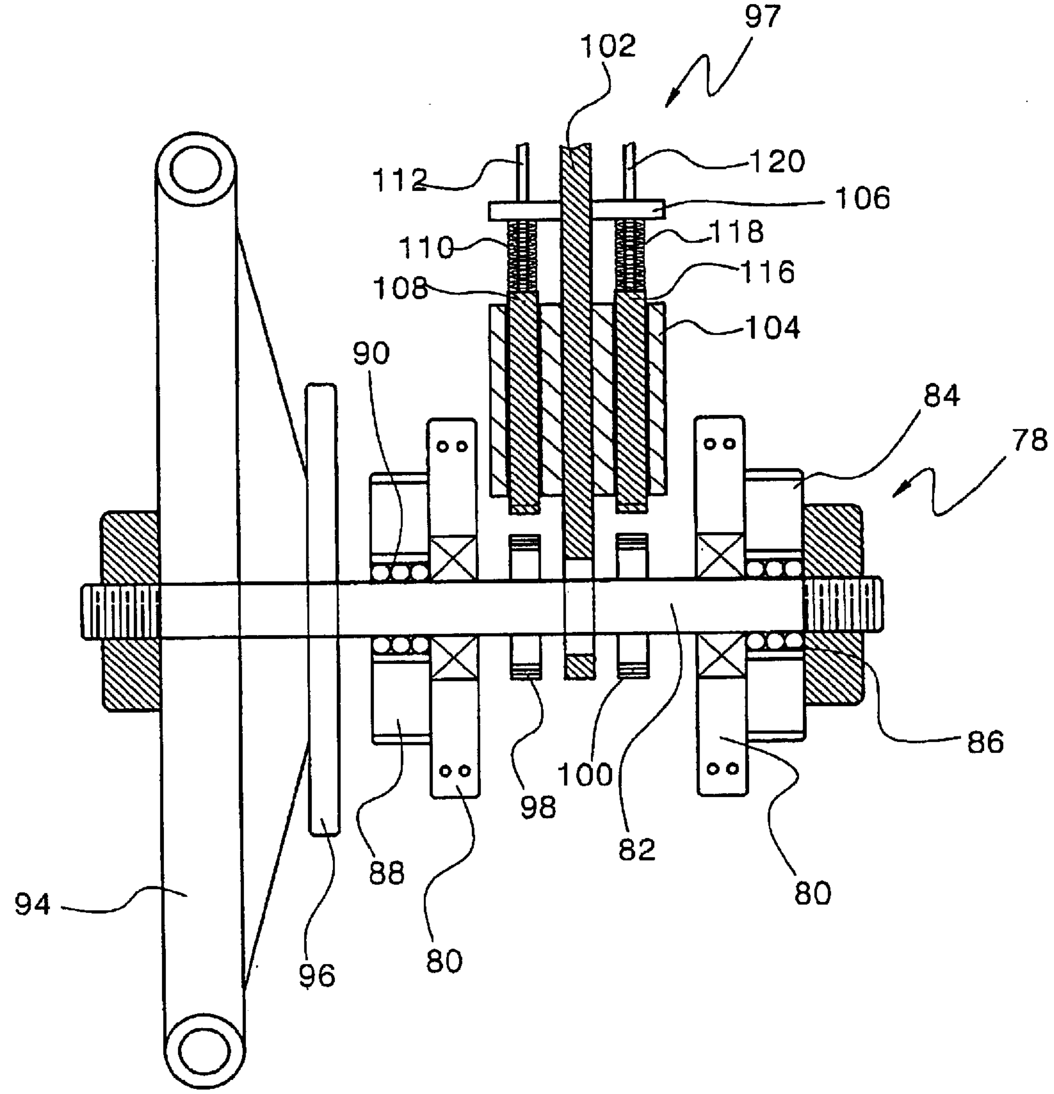
FIG. 3 is a cross sectional view of the rear-wheel driving section shown in FIG. 1.
Figure 10:
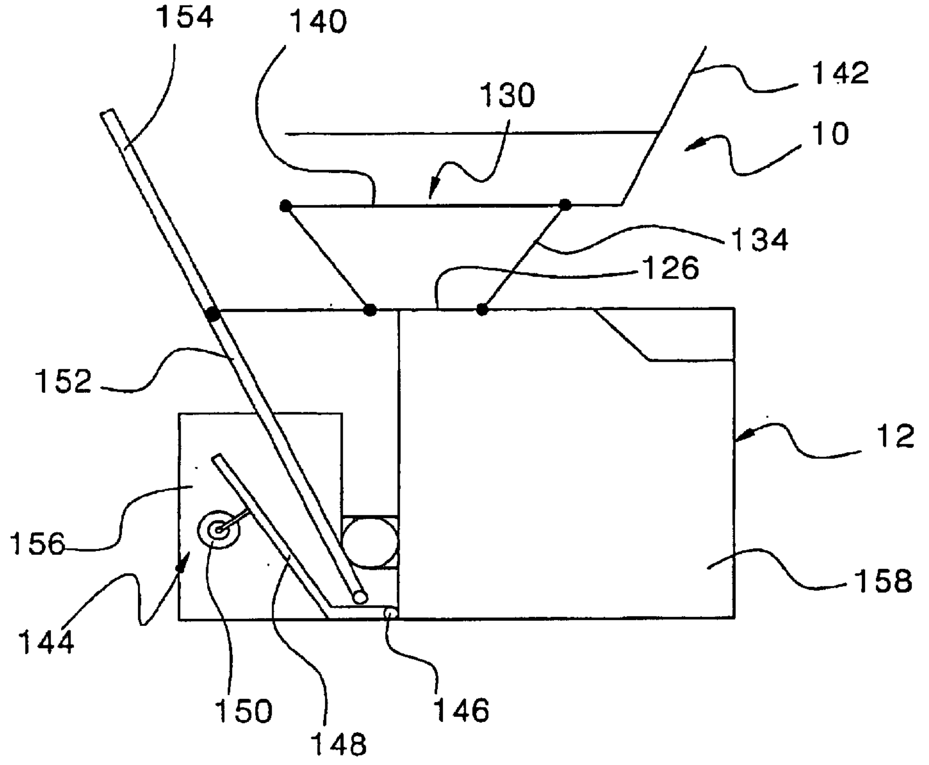
FIG. 10 is a side view of auxiliary driving means for a front wheel.

Referring to FIGS. 1 to 2 and 10, a wheel chair of the present invention includes a wheel frame 12 having a seat 10 on which a user sits. The wheel frame 12 is provided with an actuator 14, such as a combustion engine or an electric motor, for supplying a driving power.

As shown in FIG. 2, the actuator 14 is coupled to a power generating unit 16 for driving the wheel chair. The power generating unit 16 includes a main shaft 18 such as an axle, and preferably, the main shaft 18 is provided at an end thereof with a pulley 20 connected to the actuator 14 through a connecting member such as a belt or chain.

The main shaft 18 includes a first transmission 22 for transmitting the driving force in accordance with the drive of the main shaft. Preferably, the first transmission 22 includes sun and planet gears. Specifically, the first transmission includes a sun gear 24 fixed to the main shaft 18, a plurality of planet gears 26 meshed with the sun gear 24, and another sun gear, i.e., a ring gear 28, meshed with the respective planet gears 26. The plurality of planet gears 26 rotates on its axis according to the rotation of the sun gear 24, or revolves according to the load. Preferably, the ring gear 28 is formed with teeth on inner and outer peripheries thereof.

The first transmission 22 is provided with a carrier 30 accommodating the main shaft 18 therein, with the carrier being no contact with the main shaft 18. The carrier includes a plurality of supporting shafts 32 which are coupled to each other via bearings to idle the planet gears 26. In particular, the carrier is provided with at an end thereof with a pulley 34.

Also, the first transmission 22 is provided with a second transmission 36. The second transmission 36 includes a driving gear 36 meshed with the teeth formed on the outer periphery of the ring gear 28 of the first transmission 22. The driving gear 38 is provided with a driving shaft 40 penetrating and fixed to a center thereof. The driving shaft 40 has at one end thereof a pulley 44 coupled to a rear wheel described hereinafter via a belt 42, and at the other end thereof two sprockets 46 and 48. The driving shaft 40 is rotatably inserted in a cylindrical key frame 50 serving as a role of a center shaft during a step operation, with a bearing interposed between them. Also, the key frame 50 includes two pulleys, i.e., a first pulley 52 and a second pulley 54. The first pulley 52 is coupled to the pulley 34 provided at the end of the carrier 30 via a belt 56, while the second pulley 54 is coupled to an axle of the rear wheel described hereinafter via a belt 58. The key frame 50 of the second transmission 36 is provided with a casing 60 for providing a sufficient space.

A first front wheel 64 is rotatably installed in the casing 60 by a rotating shaft 62. The rotating shaft 62 has a sprocket 66 which is coupled to the sprocket 46 provided at the end of the driving shaft 40 via a chain 68.

A second front wheel 72 is rotatably installed in the casing 60 by a rotating shaft 70. The rotating shaft 70 has a sprocket 74 which is coupled to the sprocket 48 provided at the end of the driving shaft 40 via a chain 76.

Also, a third front wheel 73 is rotatably installed in the casing 60 by a rotating shaft 73. The rotating shaft 71 has a sprocket (not shown) which is coupled to a sprocket 49 provided at the end of the driving shaft 40 via a chain.

With the structure as described above, a rotating direction of the driving shaft 40 is transferred to the rotating shaft without changing the rotation direction, so that the respective front wheels 64, 72 and 73 may be rotated in the same direction. Although the embodiment having three front wheels is described, two or four front wheels which are operated in the same manner as the case of three front wheels as described above may be provided.

The power generating unit 16 for driving the front wheels 64, 72 and 73 includes a follower 78 for driving the rear wheel. The follower 78 includes a follower shaft 82 rotatably fixed to a bracket 80 supporting the wheel frame. The follower shaft 82 is provided at one end thereof with a follower pulley 84 coupled to the pulley 44 of the driving shaft 40 via a main shaft belt 42. Preferably, the follower pulley 84 is constructed to be loaded upon the forward drive only. To this end, the follower pulley 84 may have an advance clutch bearing 86.

The follower shaft 82 is provided at other end thereof with another follower pulley 88 coupled to the pulley 54 of the key frame 50 via a key belt 58. Preferably, the follower pulley 88 is constructed to be loaded upon the forward drive only. To this end, the follower pulley 88 may have an advance clutch bearing 90. In particular, the key belt 58 may be supported by a tension pulley 92 mounted on the wheel frame 12, so that it can be manually manipulated by the user to release the load upon the reverse.

The follower shaft 82 of the follower 78 is provided at an end thereof with a rear wheel 94 of a large diameter actually governing the drive of the wheelchair. The rear wheel 94 is provided at inner periphery with a brake lining 96 for braking the rear wheel.

Alternatively, the follower 78 may be provided with a manually driving unit 97 for manually driving the rear wheel at impossible transmission or emergency situation. The manually driving unit 97 includes two gears fixed to the follower shaft 82 interposed between the brackets 80. Specifically, a first gear 98 is used for the advance of the rear wheel, while a second gear 100 is used for the reverse of the rear wheel. An end of a lever 102 operable by a hand of the user is installed on the follower shaft 82 between the first and second gears 98 and 100. A guide 104 is fixed in a proper position of the lever 102, and a supporter 106 is fixed on an upper portion of the guide 104.

In particular, the guide 104 has on one side thereof a first latch 108 reciprocately movable up and down and meshed with a first gear 98 to forwardly rotate the first gear. The first latch 108 is urged against the support 106 by a spring 110. The first latch 108 is coupled to a first handle 114 through a first coupling member 112. Similarly, the guide 104 has on the one side thereof a second latch 1116 reciprocately movable up and down and meshed with a second gear 100 to forwardly rotate the second gear. The second latch 116 is urged against the support 106 by a spring 118. The second latch 116 is coupled to a second handle 122 through a second coupling member 120.

In addition, the lever 102 is provided on an upper portion thereof with a pivoting piece 124. The first handle 114 is secured to one end of the pivoting piece 124, and the second handle 122 is secured to the other end thereof, so that the respective handles is moved up and down in opposed direction.

Figure 5:
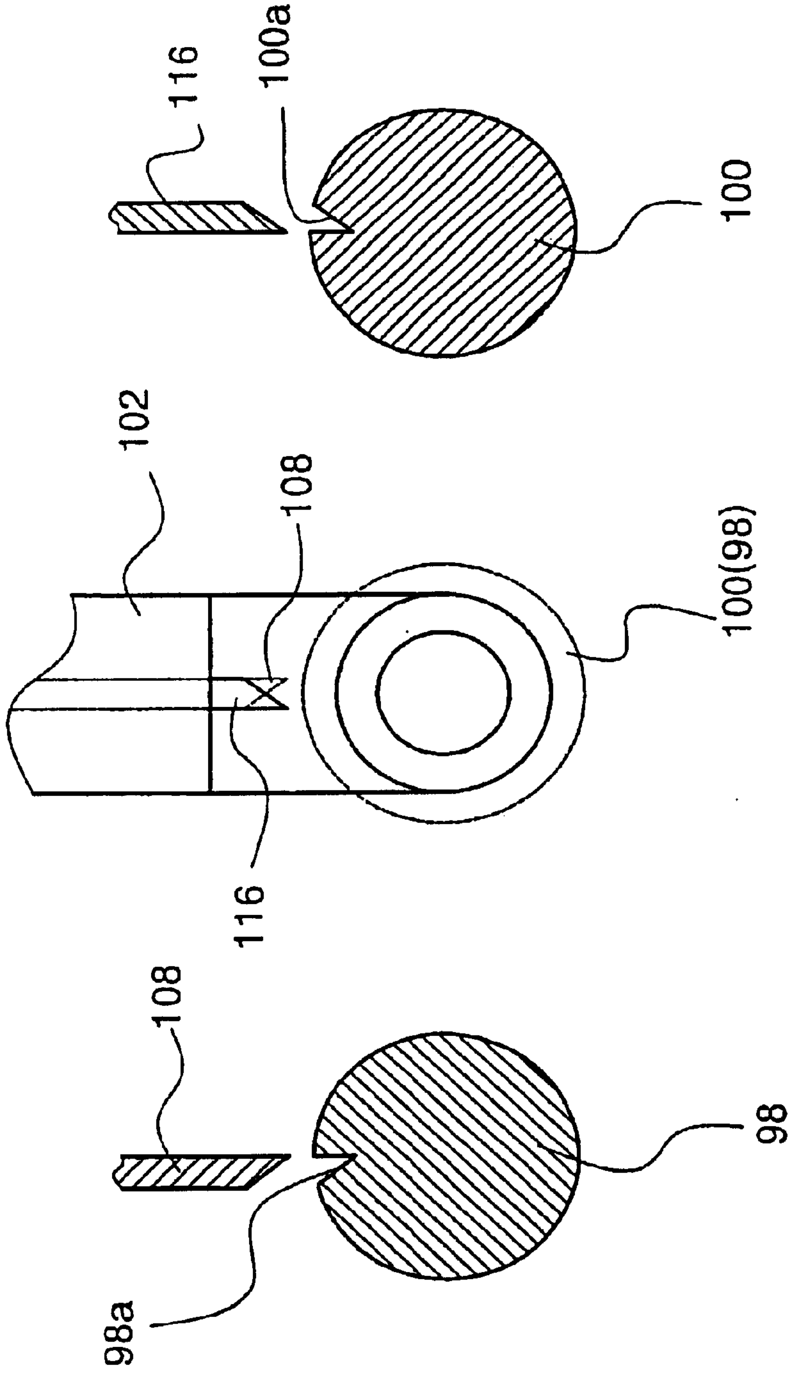
FIG. 5 is a cross sectional view of gears and latches of one rear-wheel manually driving unit.

As shown in FIG. 5, the respective gears has tooth grooves formed in a n opposed direction to each other, thereby easily rotating the gears. Specifically, the first gear 98 is formed with a tooth groove 98*a* with a vertical front and an acute rear, while the second gear is formed with a tooth groove 100*a* with an acute front and a vertical rear. In addition, the first latch 108 and the second latch 116 preferably have a shape corresponding to the respective tooth grooves 98*a* and 100*a* formed at the first and second gears 98 and 100.

Figure 4:
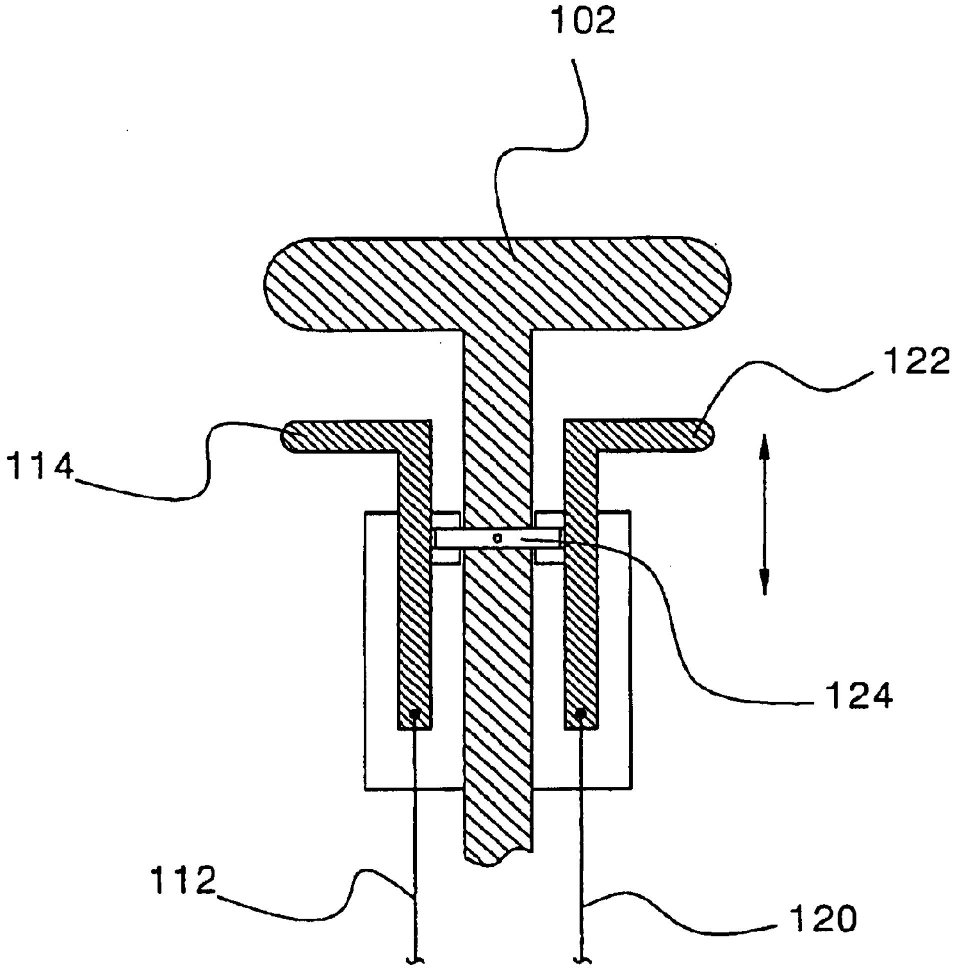
FIG. 4 is a partially cross sectional view of an upper portion of a real-wheel manually driving unit according to one embodiment of the present invention.
Figure 6:
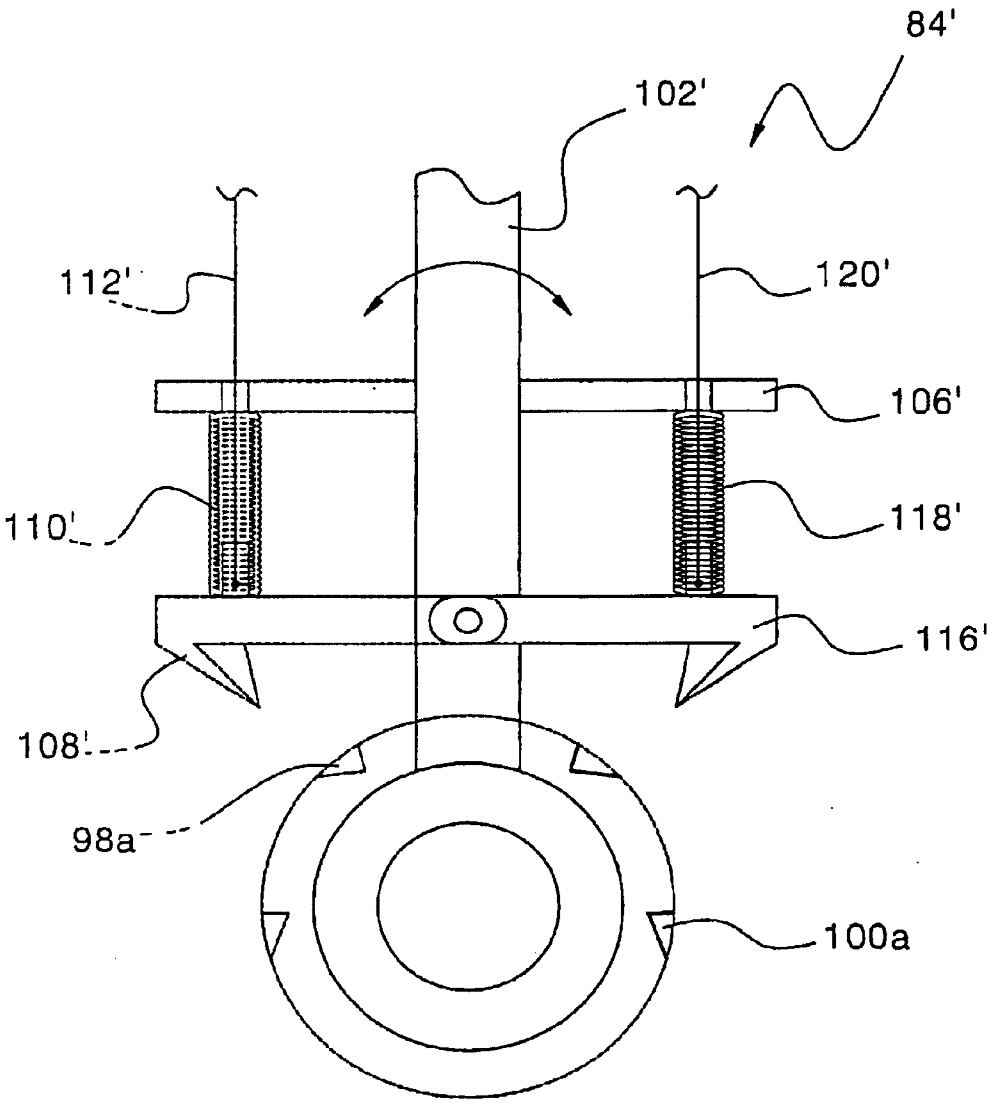
FIG. 6 is a cross sectional view of gears and latches of another rear-wheel manually driving unit.
Figure 7:
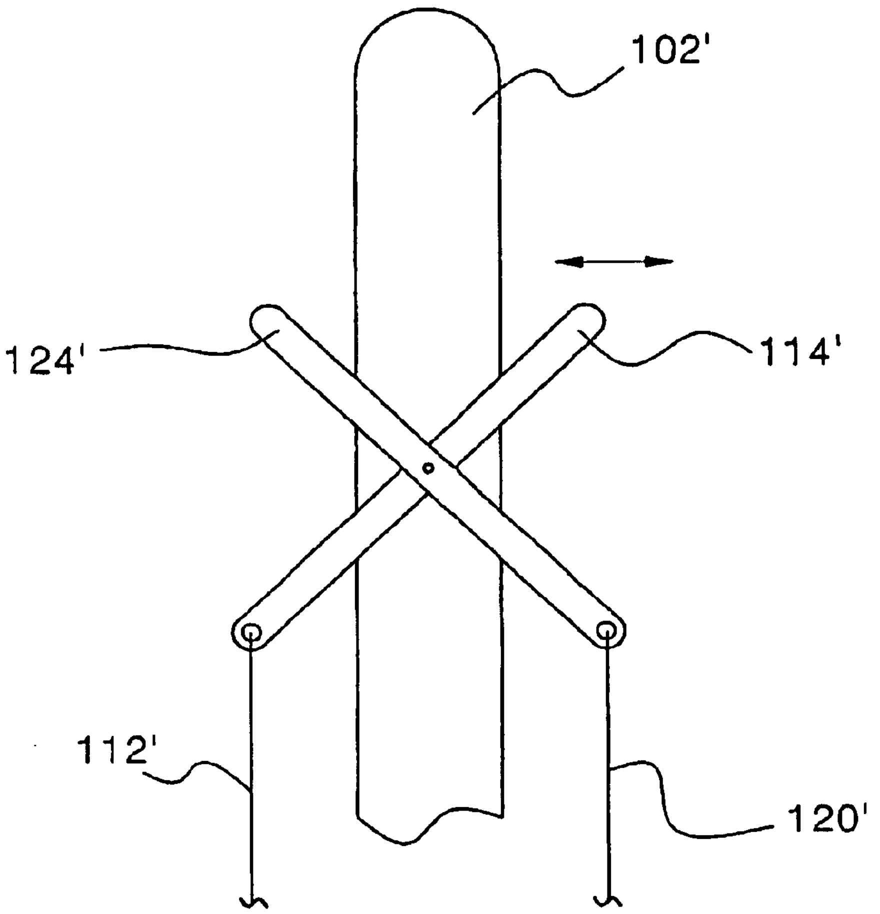
FIG. 7 is a side view of an upper portion of the real-wheel manually driving unit shown in FIG. 6.

Alternatively, a manually driving unit 84' includes, as shown in FIGS. 6 and 7, first and second horizontal latches 108' and 116'. A first handle 114' and a second handle 122' each coupled by a coupling member are installed in a cross manner to each other on a lever 102', which is different from the manually driving unit shown in FIGS. 4 and 5. Other components 110', 112', 106', 118', 120' and so forth are similar to those shown in FIGS. 4 and 5, and thus the detailed description thereof will be omitted for its clarity.

Figure 8:
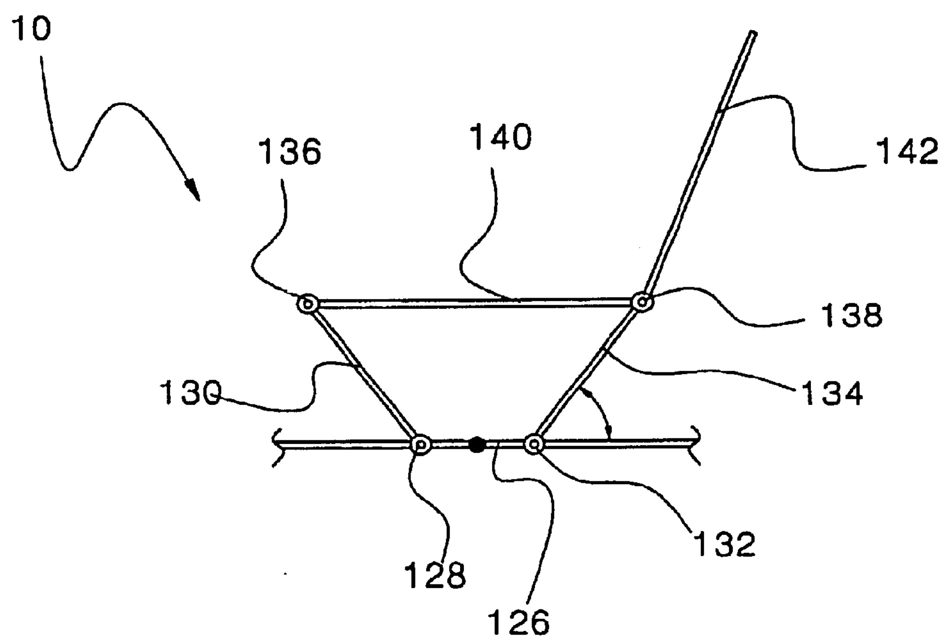
FIG. 8 is a schematic view of a seat according to one preferred embodiment of the present invention.
Figure 9:
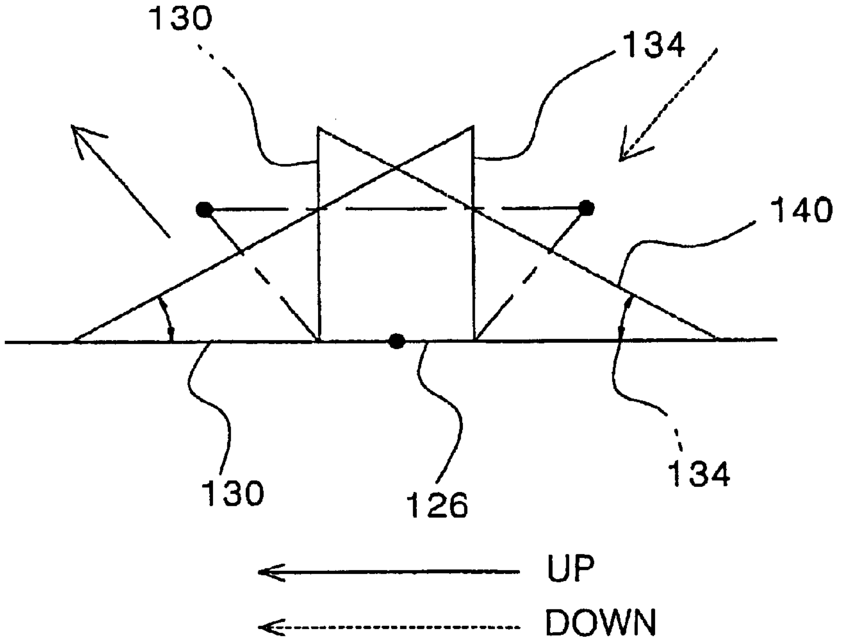
FIG. 9 is a view for the varying seat shown in FIG. 8.

As shown in FIG. 8, a seat 10 provided at the wheel frame 12 of the wheelchair according to the present invention is adapted to have a stable posture, since a seating angle is automatically changed in accordance with an inclination of the wheel chair and a user's intension. Specifically, the seat 10 includes a base 126 provided on the upper portion of the wheel body, a front member 130 rotatably coupled to a front of the base 126 by a hinge 128, a rear member 134 rotatably coupled to a rear of the base 126 by a hinge 132, a seating member 140 having one end foldably fixed to an upper portion of the front member 130 by a hinge 136 and the other end foldably fixed to an upper portion of the rear member 134 by a hinge 138, and a seat back 142 having one side fixed to a rear of the seating member 140. With the construction, as shown in FIG. 9, when the wheel chair on which the seat 10 is mounted moves on a level ground, ascends or descends a slope, since a center of gravity of the user always is toward the center of the base 126, the user may keep his/her seating posture stably. The user may adjust the seating angle of the seat by optionally regulating the inclination of the respective members by use of the hinge or hinges.

Figure 11:
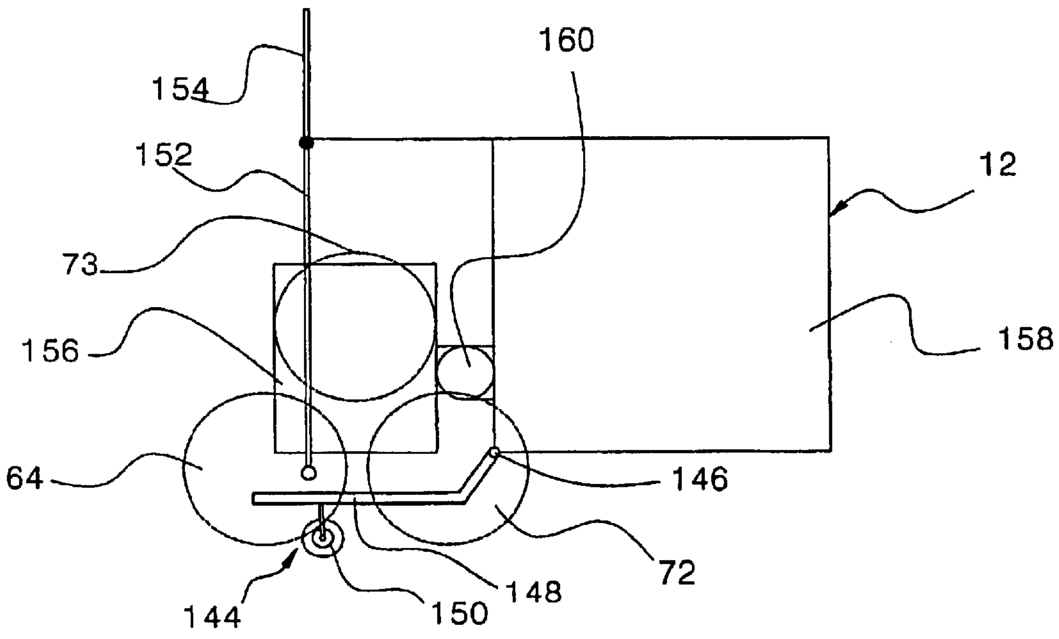
FIG. 11 is a side view of the state in which the auxiliary wheel shown in FIG. 10 is developed.
Figure 12:
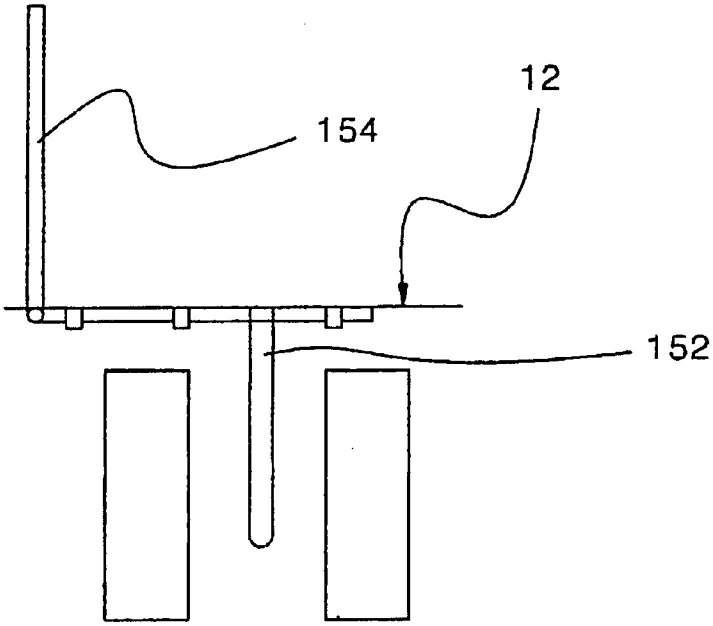
FIG. 12 is a front view of the auxiliary wheel shown in FIG. 11.

As shown in FIGS. 10 and 11, the wheel chair of the present invention includes an auxiliary driving unit 144 for manually driving the wheel chair at the interruption of the power supply or emergency situation. The auxiliary driving unit 144 includes a supporting member 148 rotatably fixed to the wheel frame 12 by a hinge 146, and an auxiliary wheel 150 rotatably fixed to the supporting member 148. A lever 152 is hingedly installed to the auxiliary driving unit 144 for rotating the supporting member 148 so as to that the auxiliary wheel 150 is contact with the ground. Preferably, the lever 152 is provided with a handle 154 extending to the side of the wheel frame so that the user may easily control the lever 152.

Preferably, the wheel frame 12 of the wheel chair according to the present invention consists of a front-wheel frame 156 and a rear-wheel frame 158, as shown in FIGS. 10 to 13. In particular, the front-wheel frame 156 is preferably coupled to the rear-wheel frame 158 by a joint 160. The rear-wheel frame 156 is jointed to the rear-wheel frame 158, so that the front-wheel frame 156 may be swiveled left and right relative to the rear-wheel frame 158. Therefore, when the wheel chair moves on an irregular or curved pavement, the wheel frame may be stably maintained.

Figure 15:
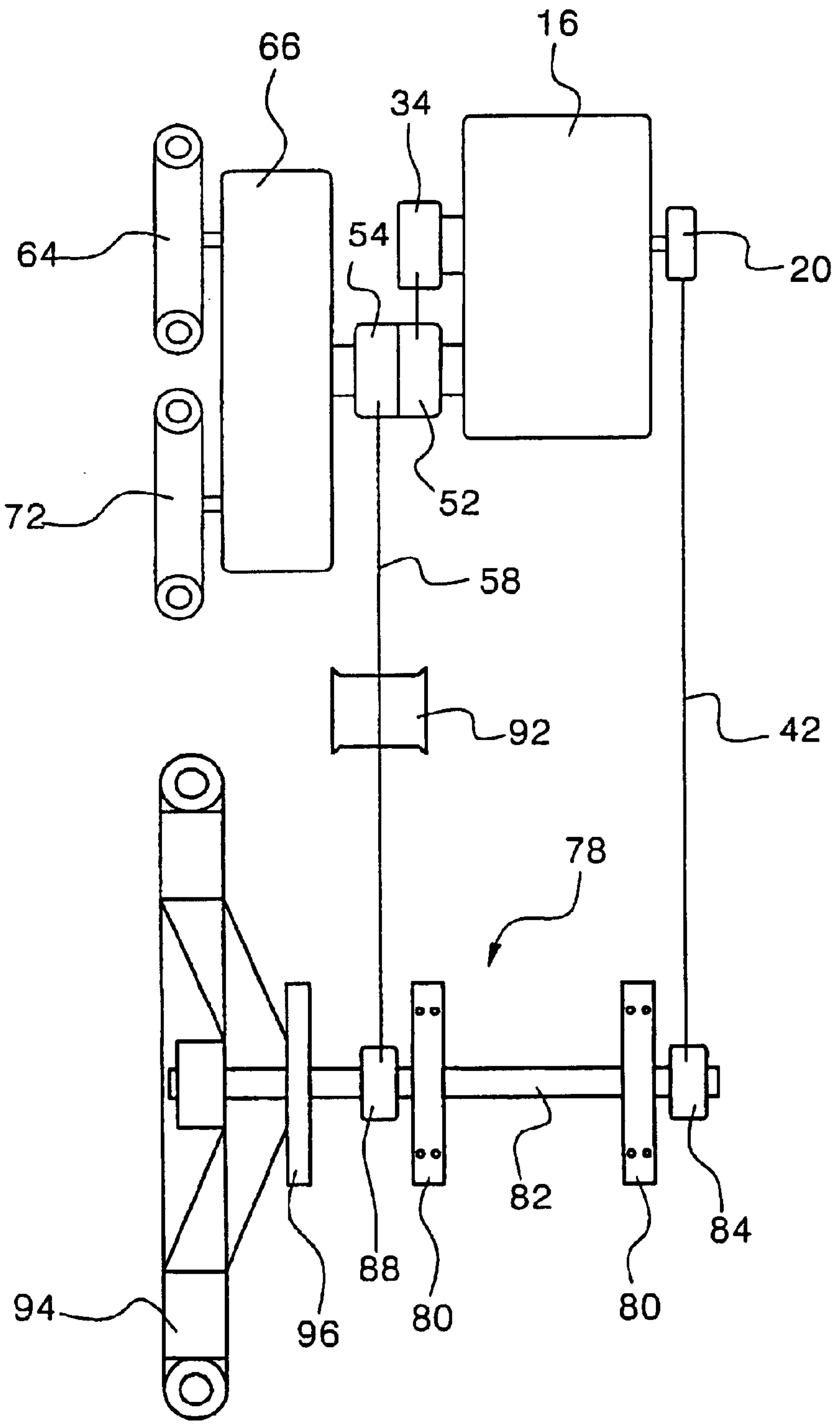
FIG. 15 is a schematic view for illustrating of a half section of the entire driving unit of a wheel chair according to another preferred embodiment of the present invention.
Figure 16:
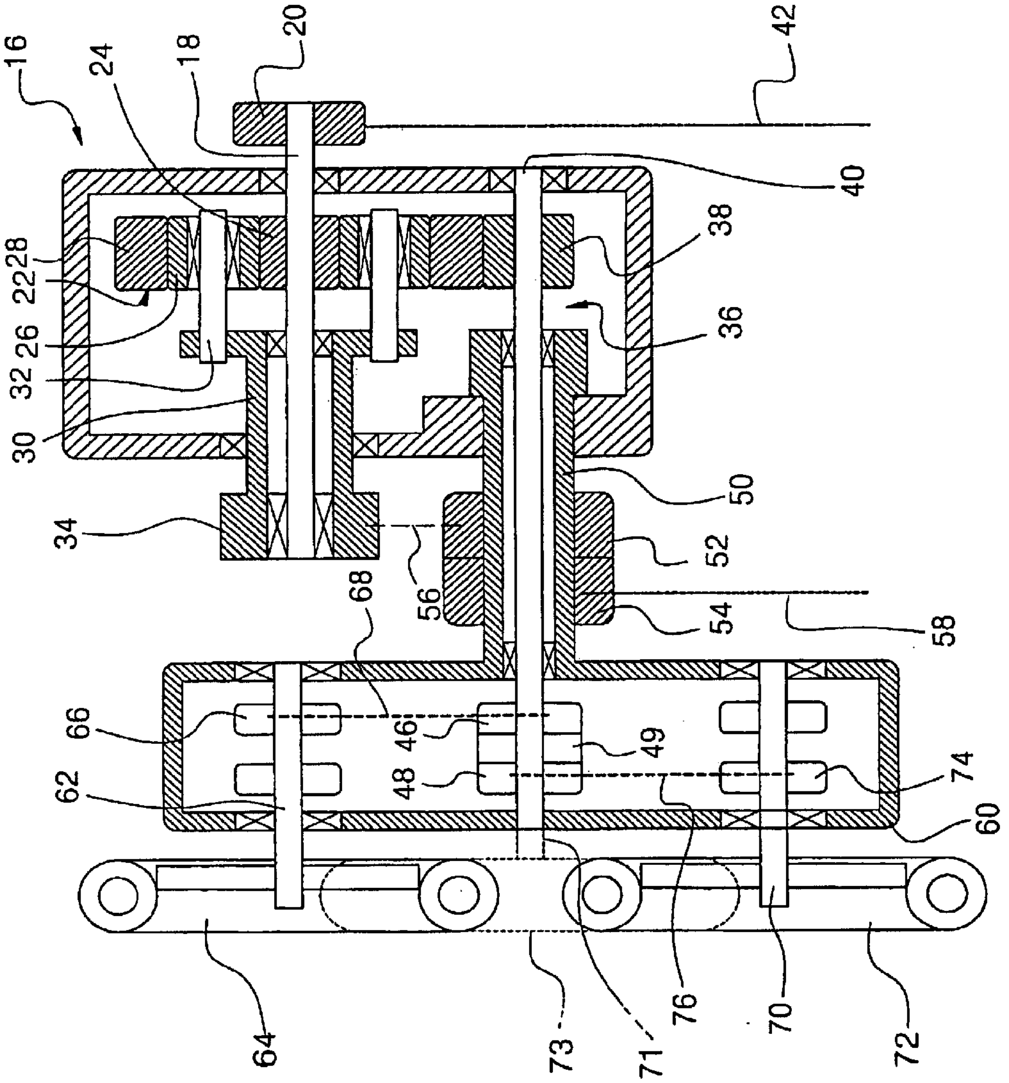
FIG. 16 is a partially enlarged sectional view of a front-wheel driving section of the driving unit of the wheel chair shown in FIG. 15.

Alternatively, as shown in FIGS. 15 and 16, according to the wheel chair of another preferred embodiment of the present invention, in order to directly transfer the power, which is supplied from the actuator 14 to the main shaft 18, to the follower shaft 82 of the follower 78, the pulley 20 of the main shaft 18 is directly coupled to the follower pulley 84 of the follower pulley 84. In this case, the pulley 44 provided at the end of the driving shaft 40 will be eliminated or omitted, while it may be rotatably mounted on an outer body or housing.

Figure 17:
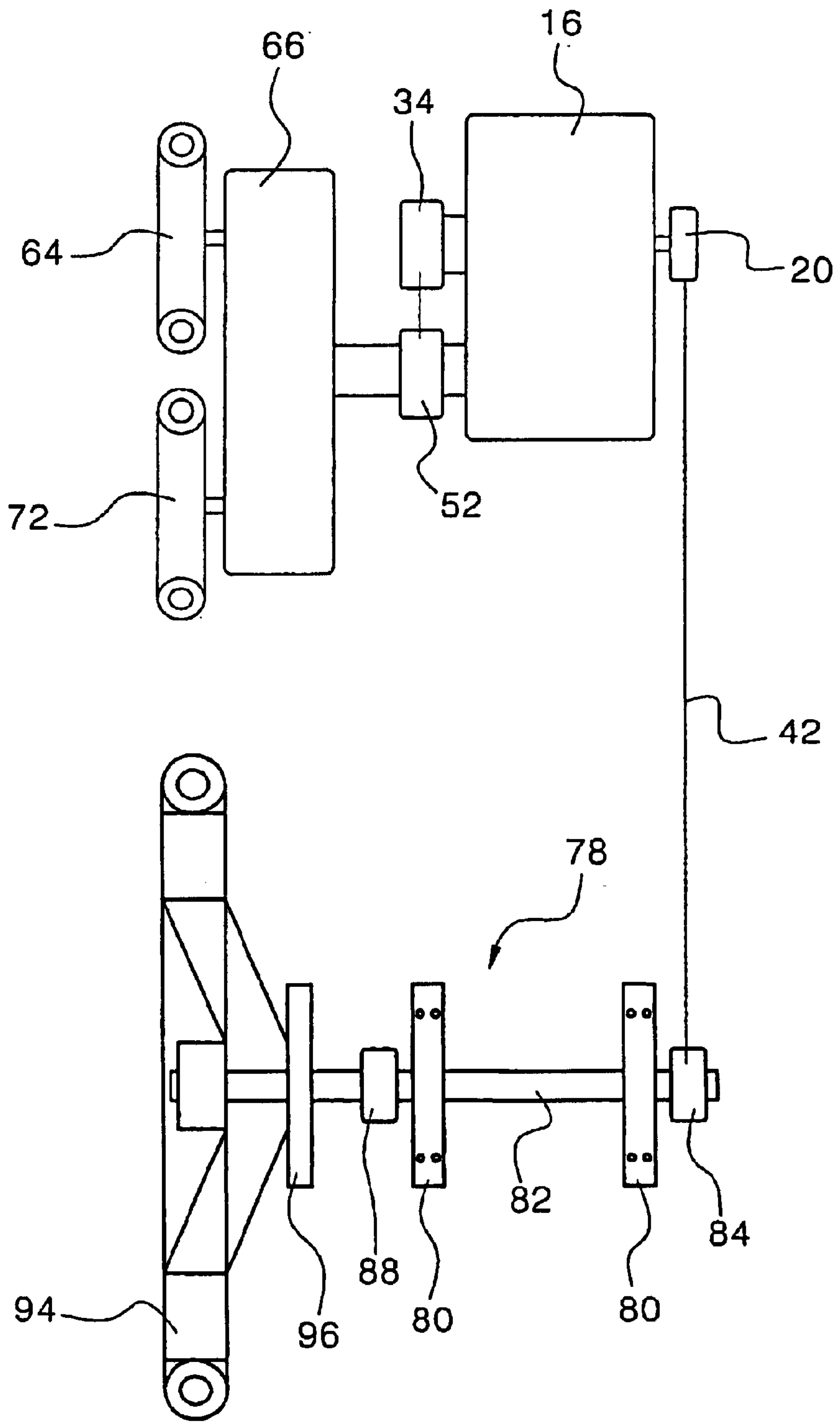
FIG. 17 is a schematic view for illustrating of a half section of the entire driving unit of a wheel chair according to a still preferred embodiment of the present invention.
Figure 18:
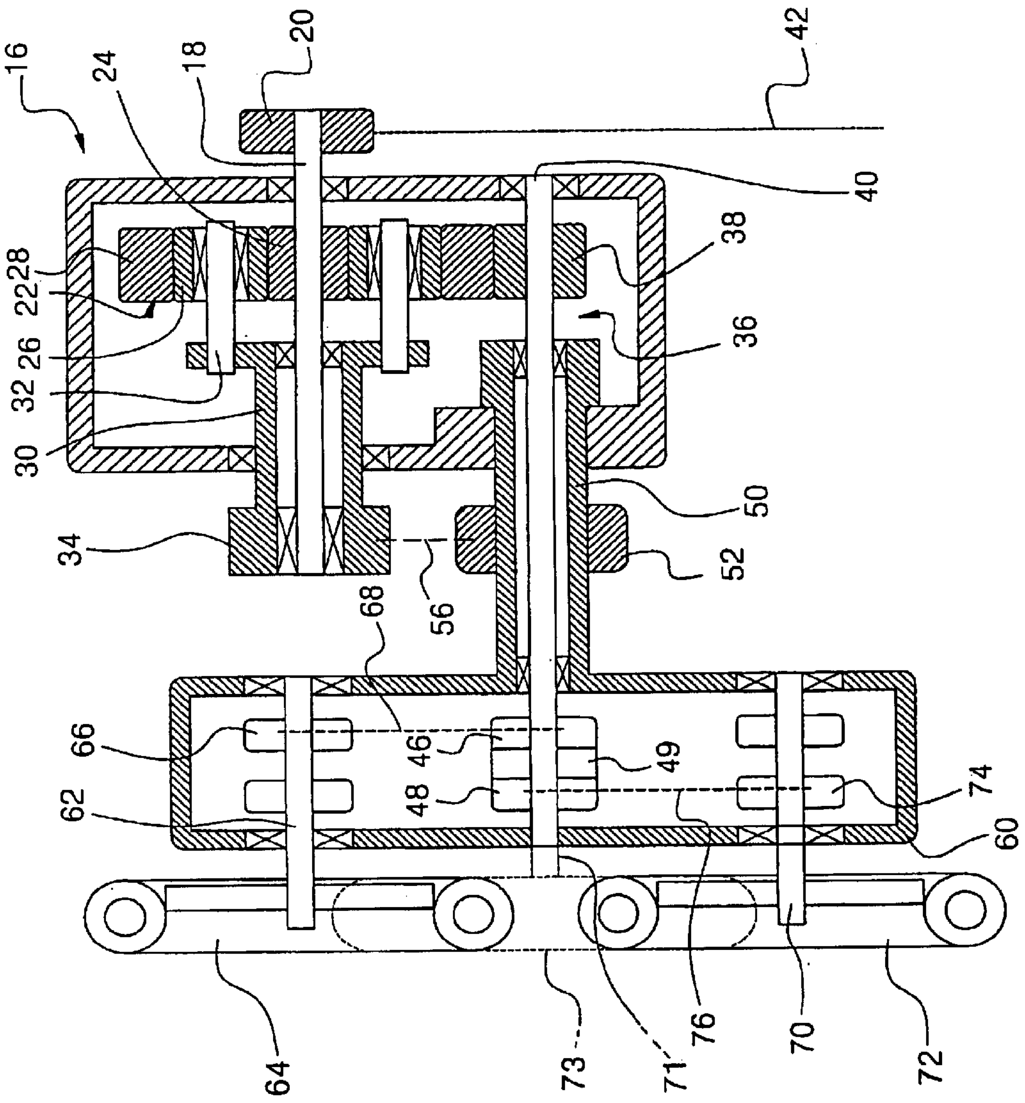
FIG. 18 is a partially enlarged sectional view of a front-wheel driving section of the driving unit of the wheel chair shown in FIG. 17.

As shown in FIGS. 17 and 18, according to a wheel chair of another preferred embodiment of the present invention, the entire construction of the wheel chair will be simplified, as well as the driving unit of the wheelchair. In addition, a part of the components described above will be eliminated to reduce its weight. As another preferred embodiment shown in FIGS. 15 and 16, since the pulley 20 of the main shaft 18 is directly coupled to the follower pulley 84 of the follower shaft 82 to directly transfer the power, the second pulley 54 of the key frame 50, the belt 58, the tension pulley 92, and the follower pulley 88 of the follower 78 will be eliminated, as well as the pulley of the driving shaft 40. Therefore, the driving unit will be simplified, and the light wheel chair will be achieved.

The operation of the wheel chair according to the present invention will be described in detail with reference to FIGS. 1 to 14.

In case that the wheel chair including the driving unit of the present invention moves on the level ground or a lower obstacle, the actuator 14 such as a motor is actuated to generate the power, and the main shaft 18 is rotated by the generated power through the main pulley 20. The sun gear 24 mounted on the main shaft is rotated in a counterclockwise, and the plurality of planet gear 26 meshed with the sun gear 24 are rotated themselves in a clockwise. Accordingly, the ring gear 28 is rotated in the clockwise. If the ring gear 28 is rotated, the driving gear 38 of the second transmission 36 meshed with the ring gear 28 is rotated, and simultaneously the driving shaft 40 is rotated. If the driving shaft 40 is rotated, the rotating force is transferred to the respective rotating shafts 62, 70 and 71 through the sprocket 46; 48; 49, the chain 68; 76 and the sprocket 66; 74, to drive the wheels 64, 72 and 73 for advancing the wheel chair. In addition, if the pulley 44 of the driving shaft is rotated by the rotation of the driving shaft 40, the follower pulley 84 coupled to the pulley 44 via the main belt 42 is rotated to rotate the rear wheel.

In case that the wheelchair ascends or descends the stairs or the steep slope in a step mode, the pulley 34 of the carrier 30 and the pulley 52 of the key frame 50 are rotated by the belt 56 to rotate the key frame 50. Accordingly, the casing 60 is rotated, so that the step drive may be achieved by going one front wheel over another front wheel. At that time, since the pulley 54 of the key frame 50 is coupled to the follower pulley 88 of the follower shaft 82 via the belt 58, the rear wheel 94 may be driven, so that the entire wheel chair may be stably and easily driven. The respective follower pulleys 84 and 88 has the clutch bearing 86; 90 for applying the load at the forward rotation, thereby stably driving the rear wheel 94.

The driving mode described above is disclosed in Korean Patent Application No. 10-0053982 entitled "Driving apparatus" filed Nov. 30, 1999 and assigned to the applicant of the present invention, the teachings of which are hereby incorporated by reference.

If the actuator 14 is counter-rotated to reverse the wheel chair, the operation as described above happens in reverse order to the above mentioned-process, thereby reversing the wheel chair and adversely processing the step drive. At that time, preferably, the tension pulley 92 is manually released from the belt 58 to release the load applied to the belt 58, so that it facilitates the reverse of the wheel chair.

In case that during the drive the transmission is interrupted or the rear wheel has to be manually driven, the user utilizes the manually driving unit 97. Specifically, when the user advances the rear wheel, in state the second handle 122 is pulled to insert the end of the first latch 108 into the tooth groove 98*a* of the first gear 98, if the lever 102 is pulled, the follower shaft 82 is rotated together with the first gear 98 in the front direction, thereby manually advancing the wheel chair. By the contrary, when the rear wheel manually reserves the wheel chair, in state the first handle 114 is pulled to insert the end of the second latch 116 into the tooth groove 100*a* of the second gear 100, if the lever 102 is pushed, the follower shaft 82 is rotated together with the second gear 100 in the rear direction, thereby manually reversing the wheel chair. Although the manually driving mode is described with reference to FIGS. 4 and 5, the manual drive may be achieved by use of the manually driving unit having the construction shown in FIGS. 6 and 7.

The seat 10 of the wheelchair according to the present invention may maintain the constantly stable posture by automatically changing the seating angle depending upon the inclination of the pavement. In particular, the seat 10 according to the present invention is preferably formed in an inverted-trapezoidal shape so that the user can have the best stable posture, as shown in FIG. 8. In case the wheel chair ascends the slope or stairs in the advance direction, the respective components are maintained at a proper angle by the hinges 128, 132, 136 and 138 each connecting the base 126, the front member 130, the rear member 134 and the seating member 140, so that the user may maintain his/her posture stably. For example, the shape of the maximally adjusted seat when ascending forwardly is shown in a solid line in FIG. 9. On contrary, the shape of the maximally adjusted seat when descending forwardly is shown in a dotted line in FIG. 9. Of course, in case of reversing, the shape of the seat has a shape contrary to that as described above. In any cases, since the center of gravity of the user is toward the center of the base 126, the user can maintain his/her seating posture stably.

The wheel chair of the present invention may be temporarily driven by use of the auxiliary driving unit at the interruption of the power supply or emergency situation. Specifically, if the handle 154 is pulled to rotate the lever 152 at the emergency stop of the wheel chair, the supporting member 148 is developed, and the auxiliary wheel 150 is contact with the ground. Simultaneously, the respective front wheels are slightly spaced apart from the ground. At that state, the user may drive the wheel chair by driving the rear wheel with his/her hands or the manually driving unit.

Figure 13:
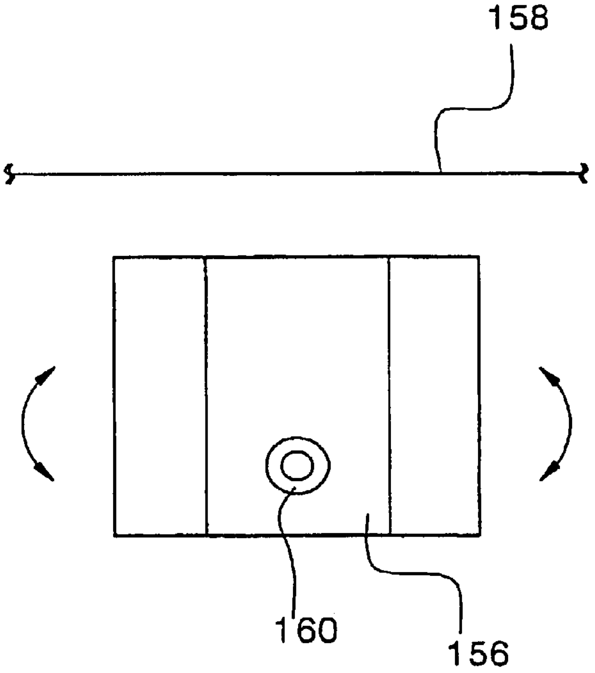
FIG. 13 is a front view of the entire front-wheel frame.
Figure 14:
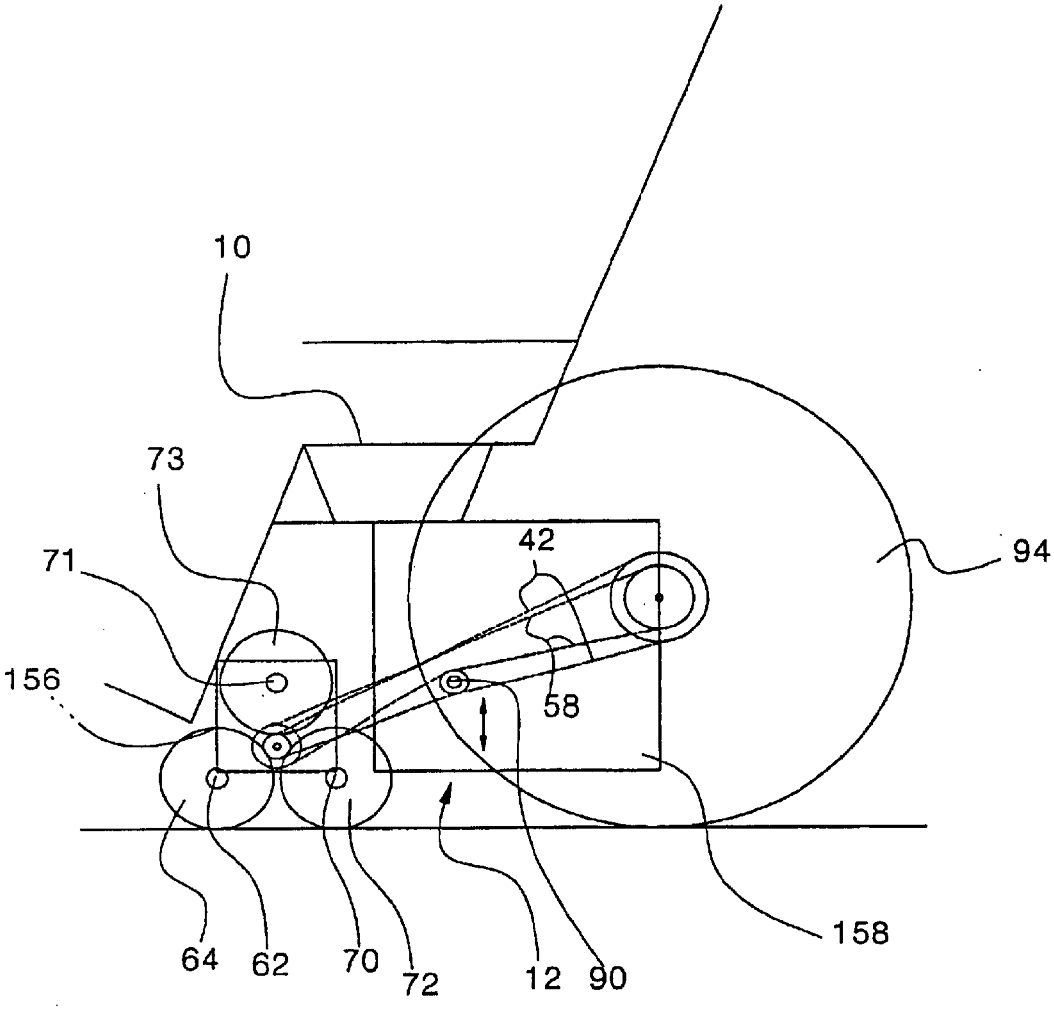
FIG. 14 is a side view for showing the entire construction of wheel chair according to the present invention.

The wheel frame 12 of the present invention includes the front-wheel frame 156 and the rear-wheel frame 158 which are coupled by the joint. When the wheel chair moves on the irregular or curved pavement, the front-wheel frame 156 may be swiveled left and right relative to the rear-wheel frame 158, as shown in FIG. 13, so that the stable posture of the wheel frame may be always maintained.

As shown in FIGS. 15 to 18, in case the pulley 20 of the main shaft 18 is directly coupled to the follower pulley 84 of the follower shaft 82, the power supplied to the main shaft 18 from the actuator 14 is directly transferred to the follower shaft 82 of the follower 78 without passing through a separate transmission, thereby simultaneously driving the front and rear wheels. In particular, in case the main shaft 18 and the follower shaft 82 are directly coupled to each other, the wheel chair may smoothly rotate in 360 degrees.

Therefore, the wheelchair may effectively and stably transfer the user, regardless of the traveling topography.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

As apparent from the above description, the wheel chair according to the present invention, it may ascend or descend the slope or stairs, as well as moving on the level ground, thereby improving the reliability.

The seating angle of the seat may be changed dependent upon the inclination or topography, thereby improving the reliability and convenience of the user.

In addition, the rear wheel may be manually driven at the interruption of the power supply, the wheel chair may be traveled by use of the auxiliary wheels in state the front wheel is spaced apart from the ground, and the front-wheel frame may be swiveled left and right relative to the rear-wheel frame, thereby facilitating the steering and drive of the wheel chair.

Furthermore, since the main shaft of the power generating unit and the follower shaft of the follower are directly coupled to each other, the additional components will be eliminated, while the wheelchair will be driven without losing the driving force. The wheel chair may be smoothly rotated in a stop state, and the simplified construction allows the weight to be decreased.

What is claimed is:

1. A wheel chair capable of going over an obstacle or ascending or descending a stair, the wheelchair comprising:

a wheel frame having a seat on which a user sits;

an actuator coupled to the wheel frame for supplying driving force;

a power generating unit having a main shaft coupled to the actuator;

a first transmission having a sun gear fixed to the main shaft, a plurality of planet gears meshed with the sun gear and rotating or revolving in accordance with applied load, a ring gear meshed with the respective planet gears, and carrier coupled to the respective planet gears and rotated by the planet gears;

a second transmission having a driving shaft meshed with the ring gear of the first transmission, a key frame rotatably installed on the driving shaft, coupled to the carrier, and serving as a role of a center shaft during a step operation, and a casing fixed to the key frame;

a plurality of front wheels each coupled to the driving shaft of the second transmission and fixed to rotating shafts each rotatably fixed to the casing;

a follower directly drivingly coupled to the power generating unit, and having a follower shaft to which the wheel frame is fixed; and a rear wheel fixed to an end of the follower shaft of the follower.

2. The wheel chair as claimed in claim 1, wherein the carrier is provided at an end thereof with a pulley, and the key frame is provided with two pulleys, with the pulley of the carrier drivingly coupled to any one of the pulleys of the key frame via a belt.

3. The wheel chair as claimed in claim 1, wherein the driving shaft is provided at an end thereof with a driving shaft pulley, the follower shaft of the follower is provided with two follower shaft pulleys, the other pulley of the key frame is operatively coupled to any one of the pulleys of the follower shaft by a key belt, and the driving shaft pulley is operatively coupled to the other pulleys of the follower shaft by a main shaft belt.

4. The wheel chair as claimed in claim 3, wherein the respective pulleys provided at the follower shaft has a clutch bearing of which a load is applied in an advance direction only.

5. The wheel chair as claimed in claim 3, wherein the key belt is supported by a tension pulley for releasing a load, when the wheel chair reverses.

6. The wheel chair as claimed in claim 1, wherein the driving shaft is provided at the other end with a plurality of sprockets corresponding to the number of front wheels, and the rotating shaft to which the respective front wheels is fixed is provided with sprockets each coupled to the corresponding sprockets of the driving shaft via a chain.

7. The wheel chair as claimed in claim 1, further comprising a manually driving unit for manually advancing or reversing the rear wheel, when power transmission is impossible.

8. The wheel chair as claimed in claim 7, wherein the manually driving unit has a first gear fixed to the follower shaft for advancing the rear where and having a plurality of tooth grooves, a second gear fixed to the follower shaft for reversing the rear where and having a plurality of tooth grooves, a lever disposed between the first gear and the second gear and handled by a hand of a user, a guide provided at the lever, a support provided on an upper portion of the guide, a first latch reciprocately installed at one side of the guide for forward rotating the first gear, having an end thereof meshed with the tooth groove of the first gear, and urged by a spring, a first handle coupled to the first latch by a first coupling member, a second latch reciprocately installed at the other side of the guide for rearward rotating the second gear, having an end thereof meshed with the tooth groove of the second gear, and urged by a spring, and a second handle coupled to the second latch by a second coupling member.

9. The wheel chair as claimed in claim 8, wherein a pivoting piece is fixed to the guide, and the first handle is hingedly fixed to one end of the pivoting piece, while the second handle is hingedly fixed to the other end thereof.

10. The wheel chair as claimed in claim 1, wherein the seat is formed in an inverted-trapezoidal shape, and has a base provided on an upper portion of the wheel body, a front member hinged to a front of the base, a rear member hinged to a rear of the base, and a seating member having one end hinged to an upper portion of the front member and the other end hinged to an upper portion of the rear member.

11. The wheel chair as claimed in claim 1, further comprising an auxiliary driving unit including a supporting member rotatably fixed to the wheel frame by a hinge, an auxiliary wheel rotatably fixed to the supporting member, a lever for rotating the supporting member so as to that the auxiliary wheel is contact with a ground, and a handle bent and extending to a side of the wheel frame to easily control the lever.

12. The wheel chair as claimed in claim 1, wherein the wheel frame has a rear-wheel frame fixed to a bracket of the follower shaft, to which the rear wheel is installed, and a front-wheel frame swivably coupled to the rear-wheel frame by a joint, to which front wheels are installed.

13. The wheel chair as claimed in claim 1, wherein a main shaft of the power generating unit is provided at an end thereof with a pulley, and the follower shaft of the follower is provided at an end thereof with a pulley, with the pulley of the main shaft coupled to the pulley of the follower shaft via a belt.

* * * * *